US012779567B2

(12) United States Patent
Yoshikawa et al.

(10) Patent No.: US 12,779,567 B2
(45) Date of Patent: Nov. 3, 2026

(54) ANODIC OXIDATION-ASSISTED GRINDING APPARATUS AND ANODIC OXIDATION-ASSISTED GRINDING METHOD

(71) Applicant: JTEKT MACHINE SYSTEMS CORPORATION, Osaka (JP)

(72) Inventors: Wataru Yoshikawa, Osaka (JP); Haruyuki Hirayama, Osaka (JP); Tomohisa Kato, Ibaraki (JP)

(73) Assignee: JTEKT MACHINE SYSTEMS CORPORATION, Osaka (JP)

( * ) Notice: Subject to any disclaimer, the term of this patent is extended or adjusted under 35 U.S.C. 154(b) by 661 days.

(21) Appl. No.: 18/304,127

(22) Filed: Apr. 20, 2023

(65) Prior Publication Data

US 2023/0339032 A1 Oct. 26, 2023

(30) Foreign Application Priority Data

Apr. 25, 2022 (JP) ................................ 2022-071617

(51) Int. Cl.
*B23H 5/08* (2006.01)
*B23H 3/04* (2006.01)

(52) U.S. Cl.
CPC ................ *B23H 5/08* (2013.01); *B23H 3/04* (2013.01)

(58) Field of Classification Search
CPC ........................................................ B23H 5/08
See application file for complete search history.

(56) References Cited

U.S. PATENT DOCUMENTS

| | | | | |
|---|---|---|---|---|
| 5,032,238 | A * | 7/1991 | Ishimura | B24B 7/17 205/663 |
| 6,217,423 | B1 * | 4/2001 | Ohmori | B24B 53/017 451/63 |
| 6,739,953 | B1 | 5/2004 | Berman et al. | |
| 2001/0036746 | A1 | 11/2001 | Sato et al. | |
| 2002/0070126 | A1 | 6/2002 | Sato et al. | |
| 2003/0114004 | A1 | 6/2003 | Sato et al. | |
| 2004/0182720 | A1 | 9/2004 | Sato et al. | |
| 2007/0051632 | A1 | 3/2007 | Sato et al. | |
| 2009/0277802 | A1 | 11/2009 | Mayer et al. | |
| 2017/0072529 | A1 | 3/2017 | Yusou et al. | |
| 2020/0130138 | A1 | 4/2020 | Chang et al. | |
| 2022/0380927 | A1 | 12/2022 | Aoki et al. | |

FOREIGN PATENT DOCUMENTS

| | | | |
|---|---|---|---|
| JP | 2001-326204 | A | 11/2001 |
| JP | 2002-093761 | A | 3/2002 |
| JP | 2009-269109 | A | 11/2009 |
| JP | 2013-176838 | A | 9/2013 |
| JP | 2017-056516 | A | 3/2017 |
| JP | 2017-092497 | A | 5/2017 |
| JP | 2021-027359 | A | 2/2021 |
| JP | 2022-180855 | A | 12/2022 |

* cited by examiner

*Primary Examiner* — Brian W Cohen
(74) *Attorney, Agent, or Firm* — Studebaker Brackett PLLC

(57) ABSTRACT

An anodic oxidation-assisted grinding apparatus includes an electrolyte supply passage configured to pour an electrolyte at least between a cathode and a workpiece, a direct current power source configured to apply a direct current, via the electrolyte, to an anode, the cathode, and the workpiece to form an anodic oxidation film on a surface of the workpiece, and a grindstone configured to grind the anodic oxidation film formed on the surface of the workpiece.

5 Claims, 19 Drawing Sheets

ANODIC OXIDATION-ASSISTED GRINDING APPARATUS AND ANODIC OXIDATION-ASSISTED GRINDING METHOD

CROSS-REFERENCE TO RELATED APPLICATIONS

This application is based on and claims priority under 35 USC 119 from Japanese Patent Application No. 2022-071617 filed on Apr. 25, 2022, the entire content of which is incorporated herein by reference.

TECHNICAL FIELD

The present invention relates to an anodic oxidation-assisted grinding apparatus and an anodic oxidation-assisted grinding method in which a surface of a workpiece is ground with a grindstone by applying an anodic oxidation reaction that occurs on the surface of the workpiece in a case where a direct current passes through the workpiece via an electrolyte.

BACKGROUND ART

As a surface grinding apparatus used for surface-grinding a workpiece such as a SiC wafer, there is an anodic oxidation-assisted grinding apparatus in the related art (JP2021-27359A). The anodic oxidation-assisted grinding apparatus includes a container configured to store an electrolyte, and during processing of a workpiece, the workpiece is immersed in the electrolyte stored in the container, a direct current flows through an anode, a cathode, and the workpiece via the electrolyte, and a surface of the workpiece is ground with a grindstone by utilizing an anodic oxidation reaction generated on the surface of the workpiece.

In such an anodic oxidation-assisted grinding apparatus, even in a case of grinding a workpiece such as a SiC wafer, a grindstone with general abrasive grains such as cerium oxide and free abrasive grains can be used since a surface of the SiC wafer is softened by anodic oxidation. Thus, as compared with grinding with a diamond wheel, there are advantages in that tool costs can be reduced by making the grindstone non-superabrasive, while reducing damage to the surface of the SiC wafer and improving surface roughness after processing.

However, in the anodic oxidation-assisted grinding apparatus in the related art, since the workpiece is immersed in the electrolyte stored in the container, the entire grinding apparatus is increased in size and complicated, and grinding dust generated in grinding the workpiece by the grindstone is accumulated in the electrolyte in the container, which makes grinding dust collection and maintenance difficult.

SUMMARY OF INVENTION

Aspect of non-limiting embodiments of the present disclosure relates to provide an anodic oxidation-assisted grinding apparatus and an anodic oxidation-assisted grinding method that can simplify and reduce a size of the entire apparatus and can facilitate grinding dust collection and maintenance. Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an anodic oxidation-assisted grinding apparatus including:

- an electrolyte supply passage configured to pour an electrolyte at least between a cathode and a workpiece;
- a direct current power source configured to apply a direct current, via the electrolyte, to an anode, the cathode, and the workpiece to form an anodic oxidation film on a surface of the workpiece; and
- a grindstone configured to grind the anodic oxidation film formed on the surface of the workpiece.

According to an aspect of the present disclosure, there is provided an anodic oxidation-assisted grinding method including:

- pouring an electrolyte at least between a cathode and a workpiece;
- applying a direct current, via the electrolyte, to an anode, the cathode, and the workpiece to form an anodic oxidation film on a surface of the workpiece; and
- grinding, with a grindstone, the anodic oxidation film formed on the surface of the workpiece.

According to an aspect of the present disclosure, there are advantages in that the entire apparatus can be reduced in size and simplified, and the grinding dust collection and the maintenance can be facilitated.

BRIEF DESCRIPTION OF DRAWINGS

Exemplary embodiment(s) of the present invention will be described in detail based on the following figures, wherein.

DESCRIPTION OF EMBODIMENTS

Figure 1:
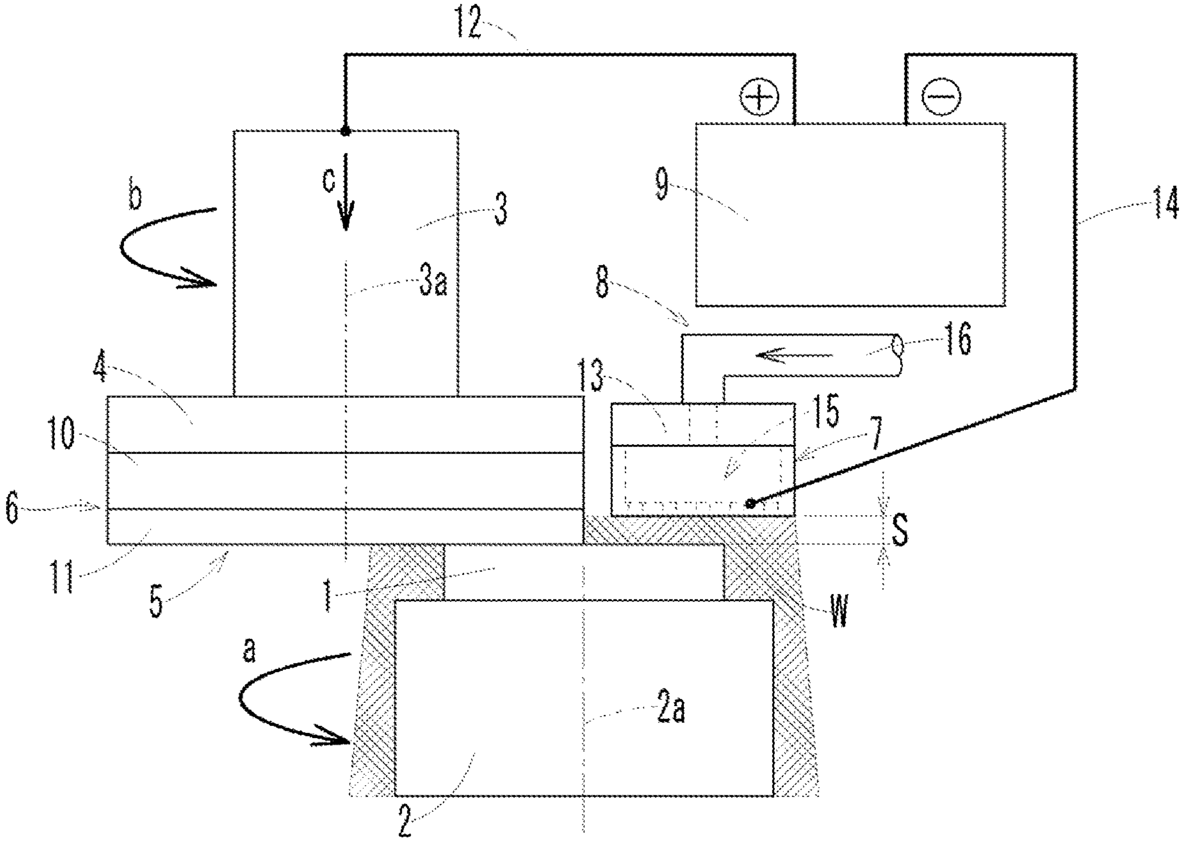
FIG. 1 is a configuration diagram of an anodic oxidation-assisted grinding apparatus according to a first embodiment of the present disclosure.
Figure 2A:
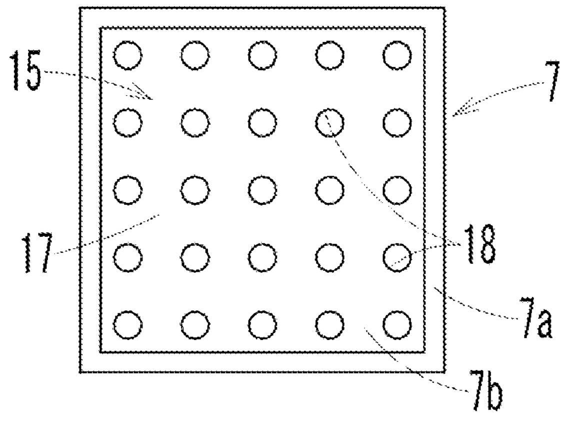
FIG. 2A is a bottom view of a cathode of the anodic oxidation-assisted grinding apparatus.
Figure 2B:
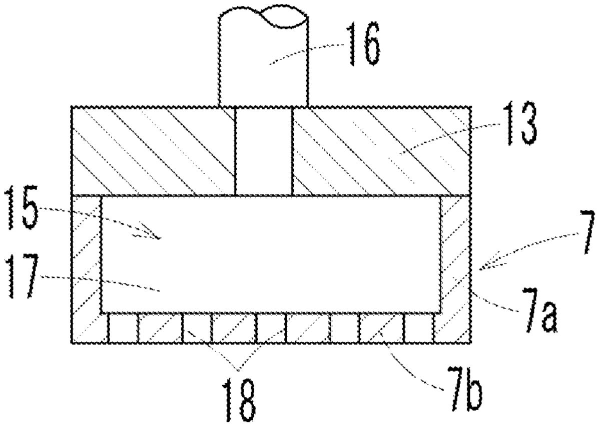
FIG. 2B is a cross-sectional view of the cathode of the anodic oxidation-assisted grinding apparatus.

Hereinafter, embodiments of the present disclosure will be described in detail with reference to the drawings. FIGS. 1, 2A and 2B show a first embodiment of an anodic oxidation-assisted grinding apparatus employed as a surface grinding apparatus. As shown in FIG. 1, the anodic oxidation-assisted grinding apparatus includes: a workpiece rotating device 2 in which a workpiece 1 is detachably mounted on an upper surface of the workpiece rotating device 2 and that is configured to rotate around a vertical axis 2_a_ in a direction of an arrow a; a grindstone spindle 3 configured to move forward and backward in an upper-lower direction while rotating around a vertical axis 3_a_ in a direction of an arrow b; a grinding wheel 6, which also serves as an anode 5, that is detachably mounted on a grindstone spindle flange 4 at a lower end of the grindstone spindle 3 and that is configured to grind the workpiece 1 mounted on the workpiece rotating device 2; a cathode 7 that is disposed, in the vicinity of a lateral side of the grinding wheel 6, above the workpiece 1 mounted on the workpiece rotating device 2 with a minute gap S between the cathode 7 and the workpiece 1; a pouring unit 8 configured to pour an electrolyte W onto the workpiece 1; and a direct current power source 9 configured to apply a direct current, via the electrolyte W, from the anode 5 to the cathode 7 through the workpiece 1.

The workpiece rotating device 2 is configured by a rotary table or the like, and may include, on a mounting surface side of the upper surface, a chuck means that is not shown such as a vacuum chuck. The workpiece 1 is detachably mounted by the chuck means. The workpiece 1 is, for example, a conductive SiC wafer, and may be any other material as long as the material is conductive.

The grinding wheel 6 configures a grindstone (a grinding means) configured to grind the workpiece 1. The grinding wheel 6 also serves as the anode 5. The grinding wheel 6 is a cup type or the like. The grinding wheel 6 includes a grindstone base material 10 configured to be detachably mounted on a lower side of the grindstone spindle flange 4, and a conductive grindstone 11 that is fixed to a lower side of the grindstone base material 10. The conductive grindstone 11 is disposed such that a center of the workpiece 1 pass through an edge width of the conductive grindstone 11.

The grindstone spindle 3, the grindstone spindle flange 4, and the grindstone base material 10 are made of metal. A positive potential-side power supply line 12 of the direct current power source 9 is configured to be connected, to be relatively slidable in the direction of the arrow b, to an upper end side of the grindstone spindle 3 or another appropriate position, and a positive potential of the direct current power source 9 is applied, to the workpiece 1, from the conductive grindstone 11 of the grinding wheel 6.

The cathode 7 also serves as a pouring unit 8 for the electrolyte W. The cathode 7 is disposed, on the lateral side of the grinding wheel 6, above the workpiece 1 with a predetermined gap, for example, the minute gap S between the cathode 7 and the workpiece 1. Specifically, the gap is a minute gap S of 1 mm or less. Preferably, the gap is a minute gap S of 500 μm or less. Hereinafter, the gap is referred to as the minute gap S, but does not refer to a gap of a specific dimension. The cathode 7 is made of a conductive material such as metal. The cathode 7 is fixed to a lower side of a support member 13 having insulating properties. A negative potential-side power supply line 14 of the direct current power source 9 is connected to the cathode 7, and a closed circuit is formed by the direct current power source 9, the anode 5, and the cathode 7, via the workpiece 1 and the electrolyte W.

A step of applying a direct current to the workpiece 1 through the closed circuit that is formed by the direct current power source 9, the anode 5, and the cathode 7 via the workpiece 1 and the electrolyte W, to generate an anodic oxidation film on the surface of the workpiece 1, is performed. The cathode 7 is disposed in such a positional relationship with workpiece 1 that an area vertically overlapping the workpiece 1 increases.

The cathode 7, which also serves as the pouring unit 8, includes an electrolyte supply passage 15. The electrolyte W supplied through an electrolyte supply pipe 16, which is connected to a support member 13 side, is poured, from the electrolyte supply passage 15, onto the workpiece 1. The pouring unit 8 includes the electrolyte supply passage 15 and the electrolyte supply pipe 16.

The pouring unit 8 may be a disposable type in which the electrolyte W poured onto the workpiece 1 is discharged instead of being circulated each time the grinding is performed. The pouring unit 8 may be a circulation type in which the electrolyte W once used for grinding is collected at an appropriate portion such as a downstream side of the workpiece rotating device 2, and in which the electrolyte W once used for grinding is purified by filtering or a chemical reaction treatment, and then the electrolyte W is circulated and supplied to the workpiece 1 again. Accordingly, the "pouring" in the present embodiment includes a case where the electrolyte W is poured onto the workpiece 1 and flows as it is, and a case where the electrolyte W once poured onto the workpiece 1 is collected, purified, circulated, and poured onto the workpiece 1 again. Further, a step of pouring the electrolyte W onto the workpiece 1 is performed by the pouring unit 8.

A pouring amount of the electrolyte W is such an amount that the minute gap S between the cathode 7 and the workpiece 1 can be filled with the electrolyte W at least during grinding. In a case where the workpiece 1 is being ground by the grinding wheel 6, a positive potential can be directly applied, to the workpiece 1, via a contact portion where the conductive grindstone 11 of the grinding wheel 6 is in contact with the upper surface of the workpiece 1. Therefore, the electrolyte W between the conductive grindstone 11 and the workpiece 1 may be of a level capable of restricting an electric resistance of the contact portion between the conductive grindstone 11 and the workpiece 1. Therefore, such an amount that the electrolyte W is at least accumulated between the workpiece 1 and the cathode 7 is sufficient. As the electrolyte W supplied between the conductive grindstone 11 and the workpiece 1, it is possible to use an electrolytic coolant, such as water, that is poured for cooling of grinding heat and washing away of grinding dust.

The gap between the cathode 7 and the workpiece 1 is set to the minute gap S necessary for the workpiece 1, mounted on the workpiece rotating device 2, to rotate around the vertical axis 2*a* without coming into contact with the cathode 7. Therefore, the electrolyte W poured onto the workpiece 1 flows toward an outside of the apparatus by receiving a centrifugal force of the workpiece 1 while being accumulated in the minute gap S on the workpiece 1. The electrolyte W is a liquid through which a direct current can pass, and may be a water-soluble coolant or may be city water.

The cathode 7 is formed, for example, in a rectangular shape in a plan view, as shown in FIGS. 2A and 2B or FIGS. 3A and 3B, or in a box shape. The cathode 7 of FIGS. 2A and 2B has a box shape including a peripheral wall portion 7*a* and a bottom wall portion 7*b*. A storage portion 17 communicating with the electrolyte supply pipe 16 is provided on an inner side of the cathode 7. A plurality of supply ports 18 in the upper-lower direction communicating with the storage portion 17 are lengthwise and crosswise provided on a bottom wall portion 7*b* side. The electrolyte supply passage 15 includes the storage portion 17 and the supply ports 18. After the electrolyte W from the electrolyte supply pipe 16 is received into the storage portion 17, the electrolyte W flows from each supply port 18 toward a workpiece 1 side.

Figure 3A:
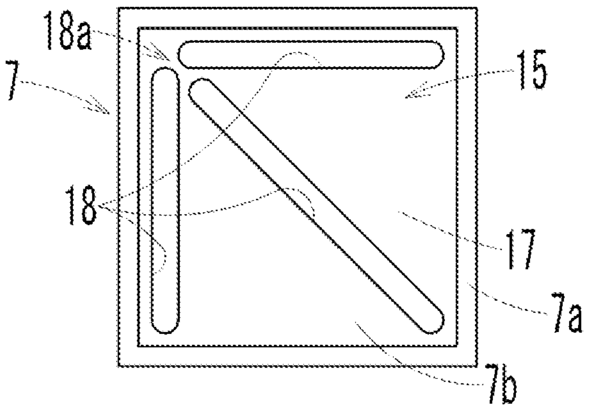
FIG. 3A is a bottom view showing a modification of the cathode.
Figure 3B:
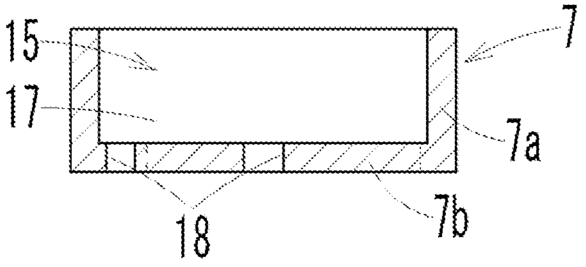
FIG. 3B is a cross-sectional view showing the modification of the cathode.

The cathode 7 shown in FIGS. 3A and 3B has a box shape. The cathode 7 is provided with the electrolyte supply passage 15 including the storage portion 17 and the plurality of supply ports 18. Each of the supply ports 18 is formed in an elongated hole shape. For example, there are three elongated hole-shaped supply ports 18, two of the supply ports 18 are arranged along two adjacent sides on a lower side of a rectangular shape in a plan view, and one of the supply ports 18 is arranged diagonally between the two supply ports 18 along two sides.

Each of the supply ports 18 of the electrolyte supply passage 15 provided in the cathode 7 may be either a round hole or a long hole, or may be such as a square hole, a triangular hole other than the round hole and the long hole. The supply port 18 may have any arrangement as long as the electrolyte W can be efficiently supplied to the workpiece 1. For example, in a case of the cathode 7 of FIGS. 2A and 2B, as many supply ports 18 as possible may be arranged in a direction corresponding to the workpiece 1. For example, in a case of the cathode 7 of FIGS. 3A and 3B, the supply ports 18 may be arranged such that a corner portion 18*a* at which the supply ports 18 are concentrated is positioned closer to a center of the workpiece 1. As described above, the supply ports 18 may be appropriately arranged in consideration of the shape, the position, other conditions, and the like of the supply ports 18. Further, a porous metal may be used as the pouring unit 8 as long as the electrolyte W can pass through the porous metal.

During grinding of the workpiece 1, the workpiece rotating device 2 in which the workpiece 1 is mounted on the upper surface of the workpiece rotating device 2 is rotated in the direction of the arrow a, and the electrolyte W is poured onto the upper surface of the workpiece 1 from the electrolyte supply passage 15 of the cathode 7 disposed above the workpiece 1. The electrolyte W poured onto the upper surface of the workpiece 1 flows toward an upper surface side of the workpiece 1. At this time, the electrolyte W receives a centrifugal force from the workpiece 1 rotating in the direction of the arrow a, the electrolyte W flows, from an outer peripheral side of the upper surface of the workpiece 1, to an outer peripheral side of the upper surface of the workpiece rotating device 2 while diffusing in a thin film shape along the upper surface of the workpiece 1.

Next, in a case where the grindstone spindle 3 rotating in the direction of the arrow b is advanced, in a direction of arrow c, toward the workpiece 1, the conductive grindstone 11 of the grinding wheel 6 comes into contact with the electrolyte W on the workpiece 1. In a case where the conductive grindstone 11 and the electrolyte W come into contact with each other, the positive potential of the direct current power source 9 is applied to the workpiece 1 via the grindstone spindle 3, the conductive grindstone 11, and the electrolyte W. Thus, a direct current flows, from the conductive grindstone 11 configuring the anode 5, to the cathode 7 via the electrolyte W, the workpiece 1, and the electrolyte W.

In a case where the conductive grindstone 11 is further advanced in the direction of the arrow c and comes into contact with the workpiece 1, the positive potential is directly applied from the conductive grindstone 11 to the workpiece 1, and the electric resistance between the conductive grindstone 11 and the workpiece 1 further decreases. Therefore, a portion, of the workpiece 1, facing the cathode 7 is anodized, and anodic oxidation occurs as a surface side of the portion is anodized. Thus, a soft anodic oxidation film is formed on the surface of the workpiece 1. Accordingly, a grinding performance of the upper surface of the workpiece 1 is improved, and the anodic oxidation film on the surface of the workpiece 1 softened by the anodic oxidation reaction can be ground and removed by cutting with the grinding wheel 6. The anodic oxidation film on the surface of the workpiece 1 is more efficiently formed as the minute gap S between the workpiece 1 and the cathode 7 reduces.

According to the anodic oxidation-assisted grinding apparatus, since it is not necessary to immerse the workpiece 1 in the electrolyte stored in the container as in the related art, the entire device can be reduced in size and simplified as compared with a related-art system in which a container was indispensable. Further, since the anodic oxidation film is ground and removed with the grinding wheel 6 while the electrolyte W is being poured, the grinding dust can be washed away by the poured electrolyte W. Therefore, the grinding dust can be easily collected outside the machine, and maintenance of the apparatus can be facilitated.

Examples of control during cutting with the grinding wheel 6 in the direction of the arrow c toward the workpiece 1 include a constant speed control method of controlling a cutting speed to a constant cutting speed, a constant load control method of controlling a cutting load to a constant cutting load, an optional load control method of controlling the cutting speed to create an optional rotational load, and an oxidation speed quick response method of controlling the cutting speed according to an anodic oxidation speed of the surface of the workpiece 1. In the case of the optional load control method, the smaller the rotational load is, the faster the cutting is performed, and in a case where the rotational load is too high, the grinding wheel 6 is controlled to be separated from the workpiece 1.

Figure 4A:
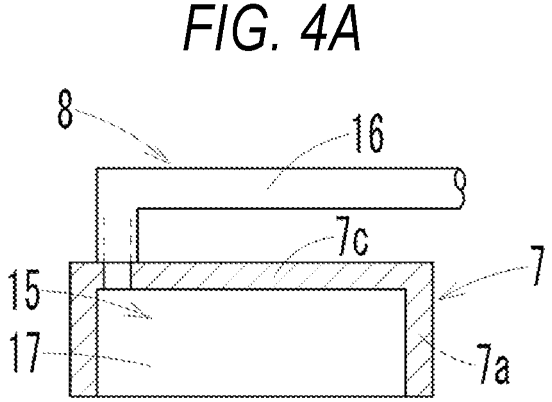
FIG. 4A is a cross-sectional view showing a modification of the cathode.
Figure 4B:
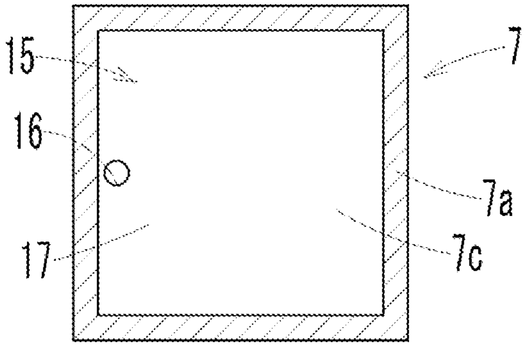
FIG. 4B is a bottom view showing the modification of the cathode.

The electrolyte supply passage 15 of the cathode 7 may be provided with the storage portion 17, for the electrolyte W, that is opened downward as shown in FIGS. 4A and 4B. That is, the cathode 7 may be formed in a downward opening shape, and may be including an upper wall portion 7*c* and the peripheral wall portion 7*a*. The inside of the cathode 7 may be used as the storage portion 17, and the electrolyte W supplied from the electrolyte supply pipe 16 may be poured onto the workpiece 1 disposed below the cathode 7 while being stored in the storage portion 17.

Figure 5A:
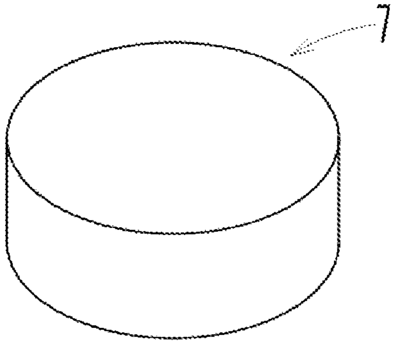
FIG. 5A is a perspective view showing a modification of the cathode.
Figure 5B:
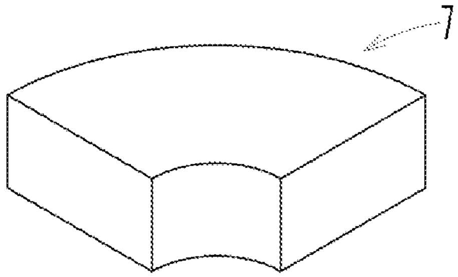
FIG. 5B is a perspective view showing the modification of the cathode.

The cathode 7 including the electrolyte supply passage 15 may have a circular shape in a plan view shown in FIG. 5A, a fan shape in a plan view shown in FIG. 5B, or other shapes.

Figure 5C:
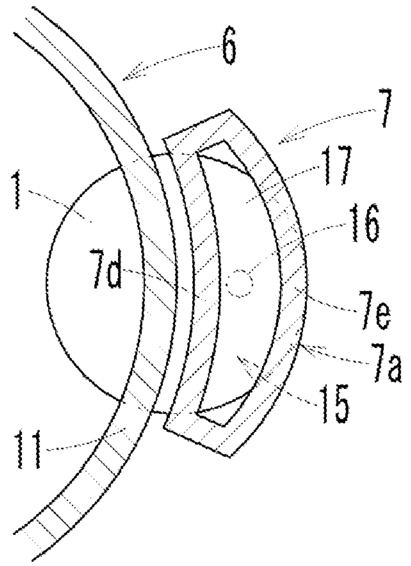
FIG. 5C is a plan view showing the modification of the cathode.

For example, as shown in FIG. 5C, among the peripheral wall portion 7*a* surrounding the storage portion 17, an inner-side peripheral wall portion 7*d* close to the grinding wheel 6 may be formed in a substantially arc shape along an outer peripheral side of the grinding wheel 6, and an outer-side peripheral wall portion 7*e* away from the grinding wheel 6 may be formed in a substantially arc shape along an outer peripheral side of the workpiece 1. The inner-side peripheral wall portion 7*d* is preferably disposed in the vicinity of the grinding wheel 6. Further, the outer-side peripheral wall portion 7*e* may be disposed inward or outward than an outer peripheral edge of the workpiece 1.

Figure 6A:
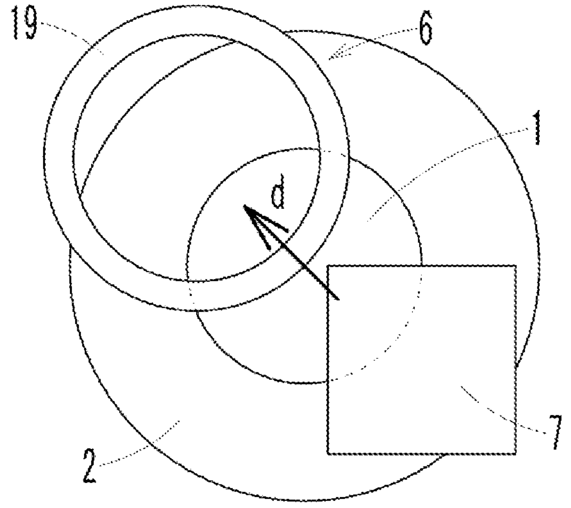
FIG. 6A is a configuration diagram of an oscillation-type anodic oxidation-assisted grinding apparatus according to a second embodiment of the present disclosure.
Figure 6B:
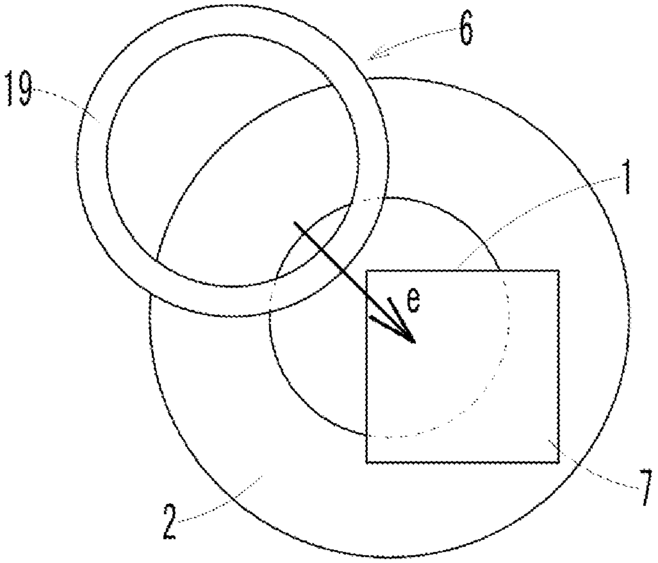
FIG. 6B is a configuration diagram of the oscillation-type anodic oxidation-assisted grinding apparatus according to the second embodiment of the present disclosure.

FIGS. 6A and 6B show a second embodiment of the present disclosure. The anodic oxidation-assisted grinding apparatus is an oscillation-type, and as shown in FIGS. 6A and 6B, the grinding wheel 6 and the cathode 7 are configured to oscillate, relative to the workpiece 1, in a substantially radial direction (directions of arrows d and e) of the workpiece 1.

As an oscillating means, there are a system in which the grinding wheel 6 and the cathode 7 are disposed at fixed positions and the workpiece rotating device 2 on which the workpiece 1 is mounted is reciprocated in the oscillating direction, and a system in which the workpiece rotating device 2 on which the workpiece 1 is mounted is disposed at a fixed position and the grinding wheel 6 and the cathode 7 are reciprocated in the oscillating direction. Other configurations are the same as those of the first embodiment.

By performing the grinding while oscillating, in the directions of the arrows d and e, the grinding wheel 6 and the cathode 7 relative to the workpiece 1, the oxidation of the upper surface of the workpiece 1 and the grinding of the upper surface of the workpiece 1 are efficiently performed.

That is, in a case where a cup-shaped grindstone 19 is used for the grinding wheel 6, the grinding position is adjusted such that a center of the workpiece 1 passes through an edge width of the cup-shaped grindstone 19, but since the center of the workpiece 1 is not located below the cathode 7, the anodic oxidation efficiency in the vicinity of the center of the workpiece 1 is extremely low.

However, in order to efficiently perform the oxidation of the upper surface of the workpiece 1 and the grinding of the upper surface of the workpiece 1, the workpiece rotating device 2 is reciprocated substantially in the radial direction of the workpiece 1 to a position where the center of the workpiece 1 is located below the cathode 7 or in the vicinity of the cathode 7, and the oscillating operation of the grinding wheel 6 and the cathode 7 relative to the workpiece 1 is repeated. Accordingly, there are advantages in that even in a case where the cup-shaped grindstone 19 is used, an amount of overlap between the workpiece 1 and the cathode 7 is increased, and the anodic oxidation efficiency of the workpiece 1 is remarkably improved.

In a case where spark-out is performed before an end of grinding, the direct current power source 9 is turned off to stop anodic oxidation of the upper surface of the workpiece 1, and the oscillating operation is continued in the same state as general grinding.

An index of surface roughness after general finish grinding is around 1 nmRa, and an index of surface roughness after chemical mechanical polishing (CMP), which is post-grinding step, is 0.1 nmRa, and as the surface roughness after finish grinding approaches 0.1 nmRa, a burden in the CMP processing in the subsequent step is reduced.

Accordingly, by applying the anodic oxidation-assisted grinding apparatus to the SiC wafer processing step, the surface roughness after grinding can be improved, and the burden in the CMP step can be reduced, thereby contributing to reduction in a total cost of SiC wafer production.

The abrasive grains used for the anodic oxidation-assisted grinding apparatus are general abrasive grains, which includes cerium oxide and zirconium oxide. The general abrasive grains refer to grains other than super-abrasive grains, which is diamond and CBN. Further, since there is no need to use super-abrasive grains, the tool cost can be reduced.

Figure 7:
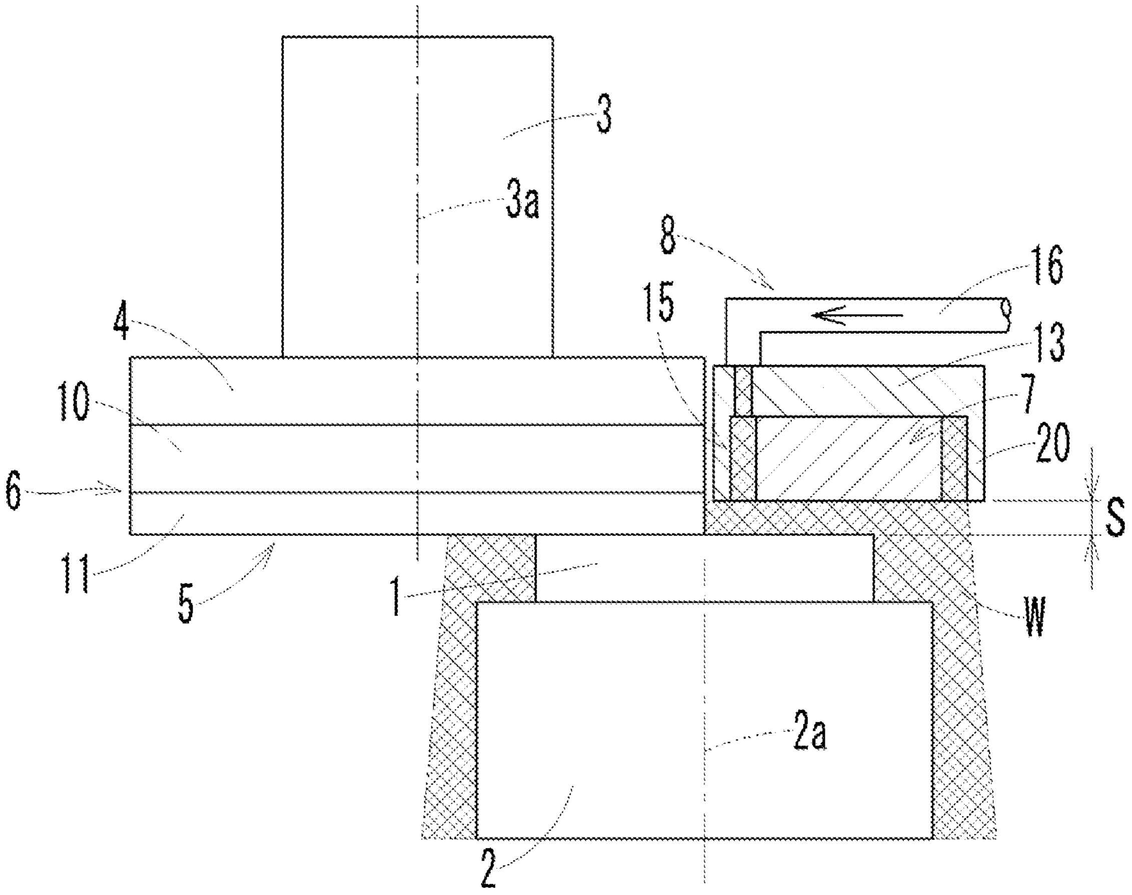
FIG. 7 is a configuration diagram of an anodic oxidation-assisted grinding apparatus according to a third embodiment of the present disclosure.
Figure 8A:
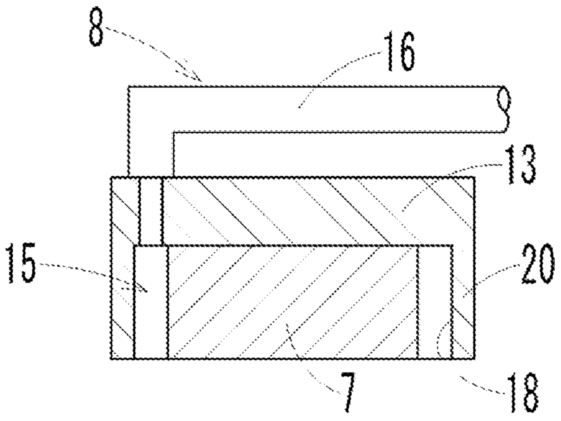
FIG. 8A is a cross-sectional view of a cathode of the anodic oxidation-assisted grinding apparatus.
Figure 8B:
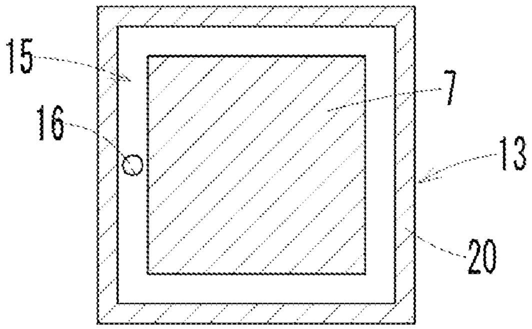
FIG. 8B is a bottom cross-sectional view of the cathode of the anodic oxidation-assisted grinding apparatus.

FIGS. 7 to 8B show a third embodiment of the present disclosure. As shown in FIG. 7, in the anodic oxidation-assisted grinding apparatus, the electrolyte supply passage 15 is formed on an outer periphery of the cathode 7 having a rectangular shape. As shown in FIGS. 8A and 8B, the cathode 7 is provided on a lower side of the support member 13 having insulation properties. On the lower side of the support member 13, a peripheral wall portion 20, having insulation properties, surrounding the outer periphery of the cathode 7 with a predetermined space, which is, for example, about several millimeters, is provided. The electrolyte supply passage 15, through which the electrolyte W from the supply ports 18 on a lower end side is poured onto the workpiece 1, is formed in the space between the cathode 7 and the peripheral wall portion 20. The cathode 7 and the peripheral wall portion 20 are fixed to the lower side of the support member 13.

The electrolyte supply passage 15 is arranged in a square shape along four sides on an outer peripheral side of the cathode 7, and the electrolyte supply pipe 16 is connected to a support member 13 side of the electrolyte supply passage 15 on one side. Other configurations are the same as those of the embodiments.

In a case where the electrolyte supply passage 15 is provided on the outer peripheral side of the cathode 7 as described above, there are advantages in that manufacturing is easy as compared with the case where the supply ports 18 vertically penetrating the bottom wall portion 7*b* of the cathode 7 are provided in the bottom wall portion 7*b* of the cathode 7 as shown in FIGS. 2A and 2B, and the entire lower surface of the cathode 7 can face the upper surface of the workpiece 1. Therefore, a sufficient amount of overlap between the cathode 7 and the workpiece 1 can be ensured, and the oxidation efficiency of the upper surface of the workpiece 1 is increased.

Figure 9A:
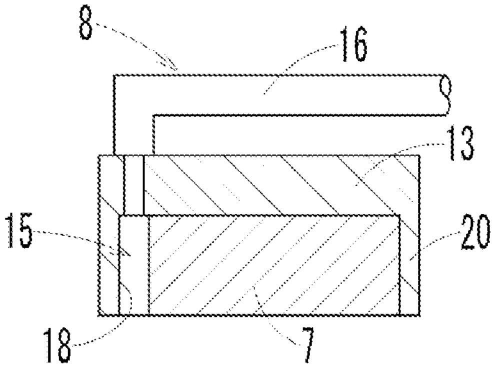
FIG. 9A is a cross-sectional view showing a modification of the cathode.
Figure 9B:
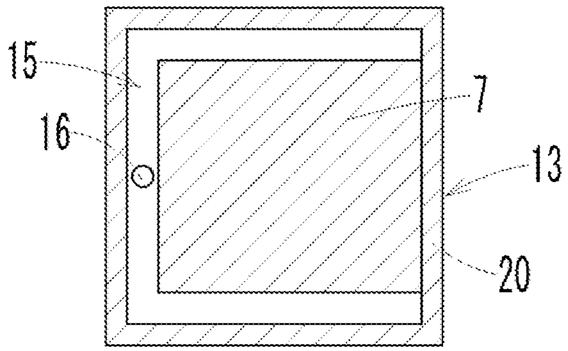
FIG. 9B is a bottom cross-sectional view showing the modification of the cathode.

The electrolyte supply passage 15 on the outer side of the cathode 7 may be configured as shown in FIGS. 9A to 11B. The electrolyte supply passage 15 of FIGS. 9A and 9B is formed in a U shape to extend over three sides of the cathode 7 and the peripheral wall portion 20, and the electrolyte supply pipe 16 is connected to a substantially central portion in a path longitudinal direction of the electrolyte supply passage 15.

Figure 10A:
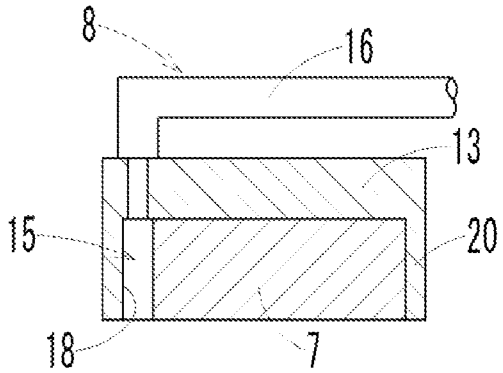
FIG. 10A is a cross-sectional view showing a modification of the cathode.
Figure 10B:
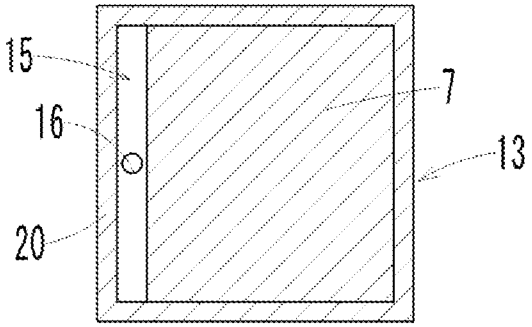
FIG. 10B is a bottom cross-sectional view showing the modification of the cathode.
Figure 11A:
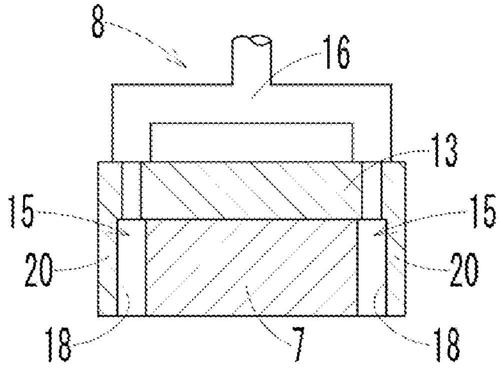
FIG. 11A is a cross-sectional view showing a modification of the cathode.
Figure 11B:
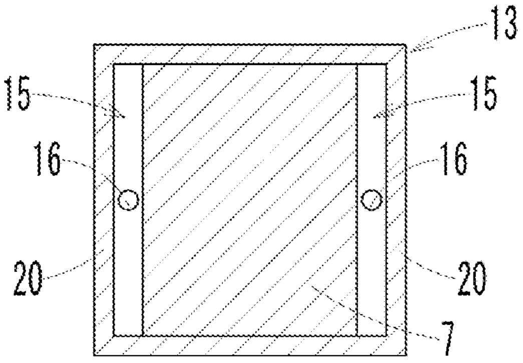
FIG. 11B is a bottom cross-sectional view showing the modification of the cathode.

The electrolyte supply passage 15 of FIGS. 10A and 10B is formed on one side between the cathode 7 and the peripheral wall portion 20, and the electrolyte supply pipe 16 is connected to the support member 13 side of a substantially central portion of the electrolyte supply passage 15. The electrolyte supply passage 15 of FIGS. 11A and 11B is formed on two facing sides between the cathode 7 and the peripheral wall portion 20, and the electrolyte supply pipe 16 is connected to a substantially central portion of each electrolyte supply passage 15. The electrolyte supply passage 15 may be provided in two adjacent sides among four sides between the cathode 7 and the peripheral wall portion 20.

Figure 12:
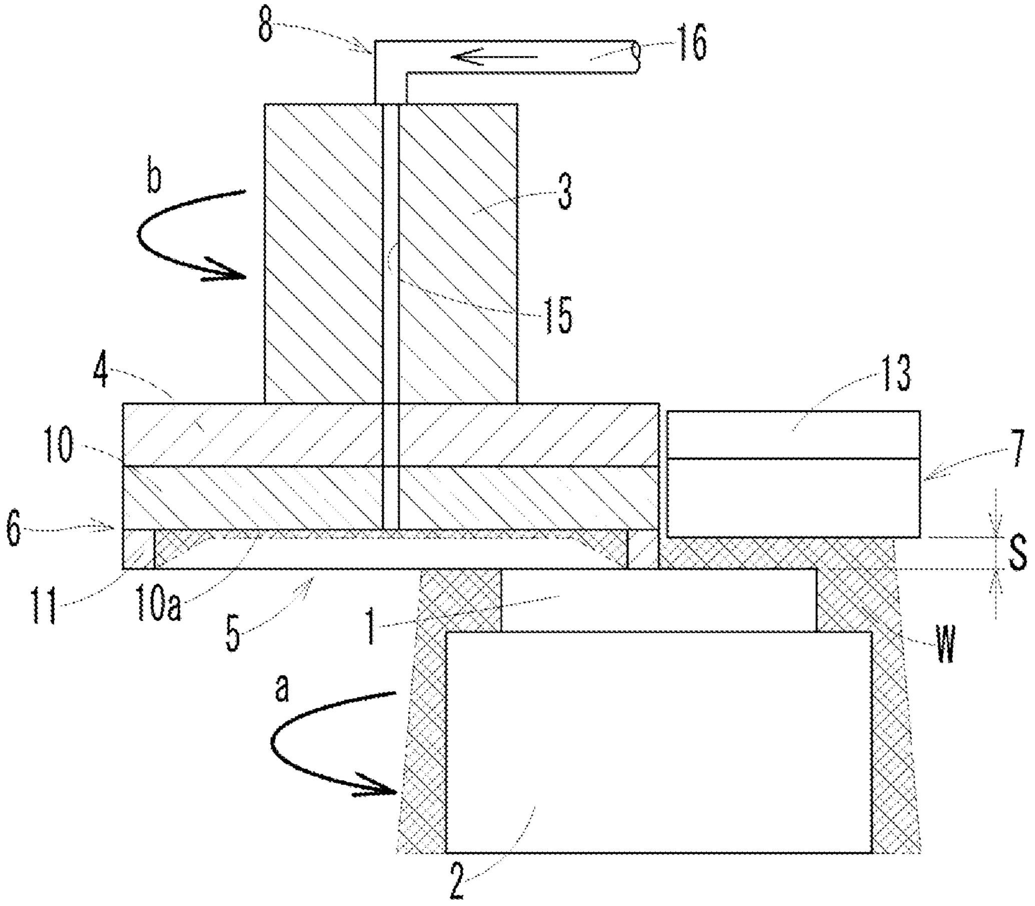
FIG. 12 is a configuration diagram of an anodic oxidation-assisted grinding apparatus according to a fourth embodiment of the present disclosure.

FIG. 12 shows a fourth embodiment of the present disclosure. In the anodic oxidation-assisted grinding apparatus, the electrolyte supply passage 15 is provided, in the upper-lower direction, in central portions of the grindstone spindle 3 and the grinding wheel 6, and the electrolyte supply pipe 16 is connected to the electrolyte supply passage 15 on an upper end side of the grindstone spindle 3.

In this embodiment, the electrolyte W supplied from the electrolyte supply pipe 16 through the electrolyte supply passage 15 is poured onto the upper surface of the workpiece 1 from an inner peripheral side of the conductive grindstone 11, which also serves as the anode 5 at a lower end of the grindstone spindle 3, by utilizing a centrifugal force.

That is, the electrolyte W supplied through the electrolyte supply pipe 16 flows down to a lower end of the grinding wheel 6 through the electrolyte supply passage 15, and then reaches the inner peripheral side of the conductive grindstone 11 while being diffused in a film shape along a lower surface 10*a* of the grindstone base material 10 by receiving the centrifugal force of the grinding wheel 6 rotating in the direction of arrow b.

The electrolyte W reaching the inner peripheral side of the conductive grindstone 11 sequentially flows downward along the inner periphery of the conductive grindstone 11, and is poured onto the upper surface side of the workpiece 1. Then, the electrolyte W on the upper surface side of the workpiece 1 receives a centrifugal force due to the rotation of the workpiece 1, and flows on the upper surface of the workpiece 1 to the outer peripheral side via a minute gap between the workpiece 1 and the conductive grindstone 11. Accordingly, the electrolyte W can be filled in a gap portion between the anode 5 and the workpiece 1 and a gap portion between the cathode 7 and the workpiece 1.

Figure 13A:
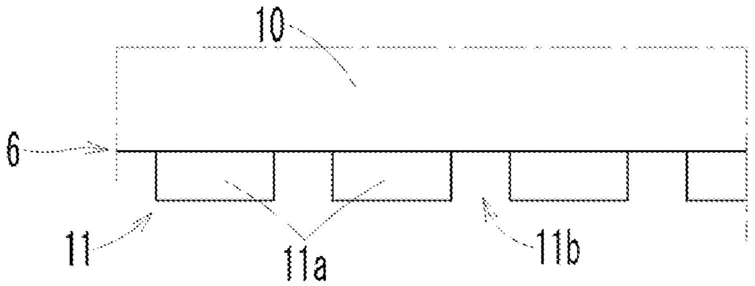
FIG. 13A is a view illustrating a grindstone.
Figure 13B:
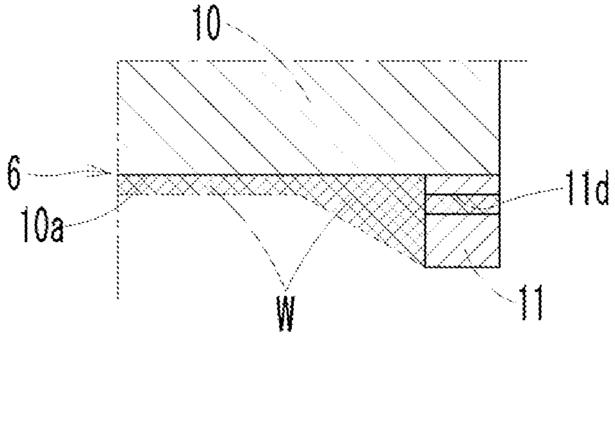
FIG. 13B is a view illustrating the grindstone.

In a case where a member in which block-shaped segment grindstones 11*a* are annularly arranged at predetermined gaps 11*b* in a peripheral direction as shown in FIG. 13A, a member in which flow passages 11*d* are radially provided at predetermined intervals in the peripheral direction as shown in FIG. 13B, or the like is used as the conductive grindstone 11, the electrolyte W flows to the outer side via the gaps 11*b* or the flow passages 11*d*, so that the electrolyte W can be diffused easily.

In this way, it is also possible to provide the pouring unit 8, for the electrolyte W, on an anode 5 side and pour the electrolyte W from the anode 5 side onto the workpiece 1. Further, since a size of the cathode 7 is not limited by the pouring unit 8, the size of the cathode 7 can be sufficiently secured according to an area of the arrangement location of the cathode 7, and the amount of overlap between the cathode 7 and the workpiece 1 can be increased to improve the efficiency of the anodic oxidation reaction.

Figure 14:
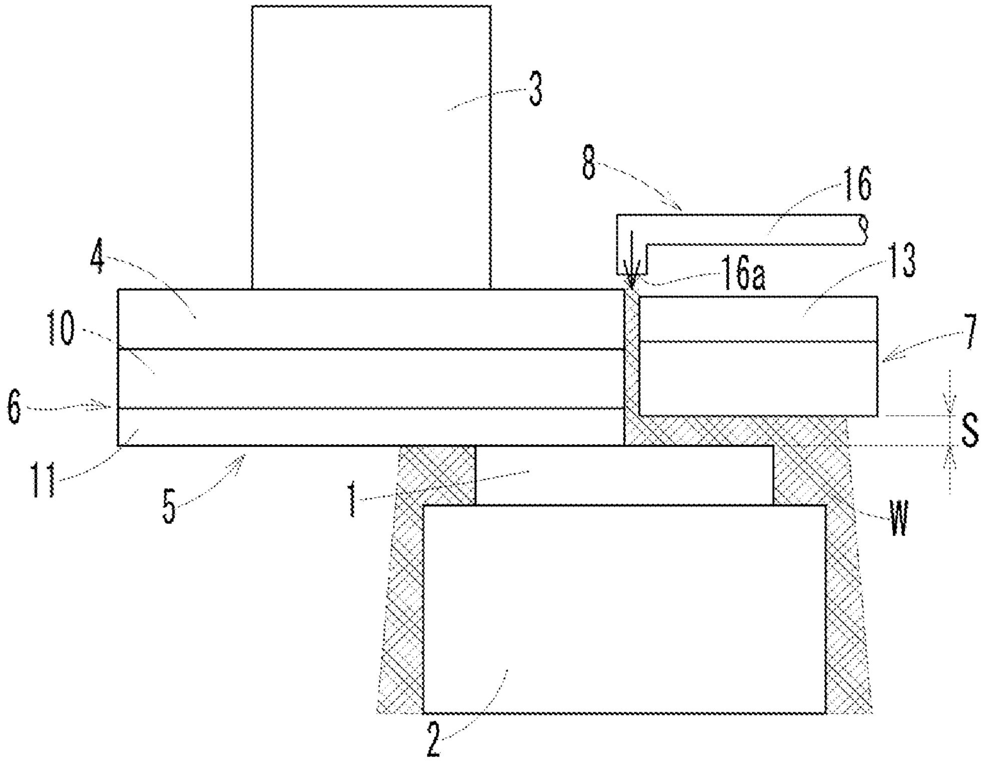
FIG. 14 is a configuration diagram of an anodic oxidation-assisted grinding apparatus according to a fifth embodiment of the present disclosure.

FIG. 14 shows a fifth embodiment of the present disclosure. In the anodic oxidation-assisted grinding apparatus, a pouring port 16*a*, which is located on a front end side of the electrolyte supply pipe 16 configuring the pouring unit 8, is disposed downward between the grinding wheel 6 and the cathode 7 or at an appropriate position in the vicinity of lateral sides of the grinding wheel 6 and the cathode 7, and the electrolyte W is poured downward, from the pouring port 16*a*, onto the workpiece 1. Other configurations are the same as those of the embodiments.

As long as the electrolyte W can be poured onto the workpiece 1 in this manner, the pouring port 16*a* of the pouring unit 8 can also be disposed at a position other than the grinding wheel 6 and the cathode 7.

Figure 15:
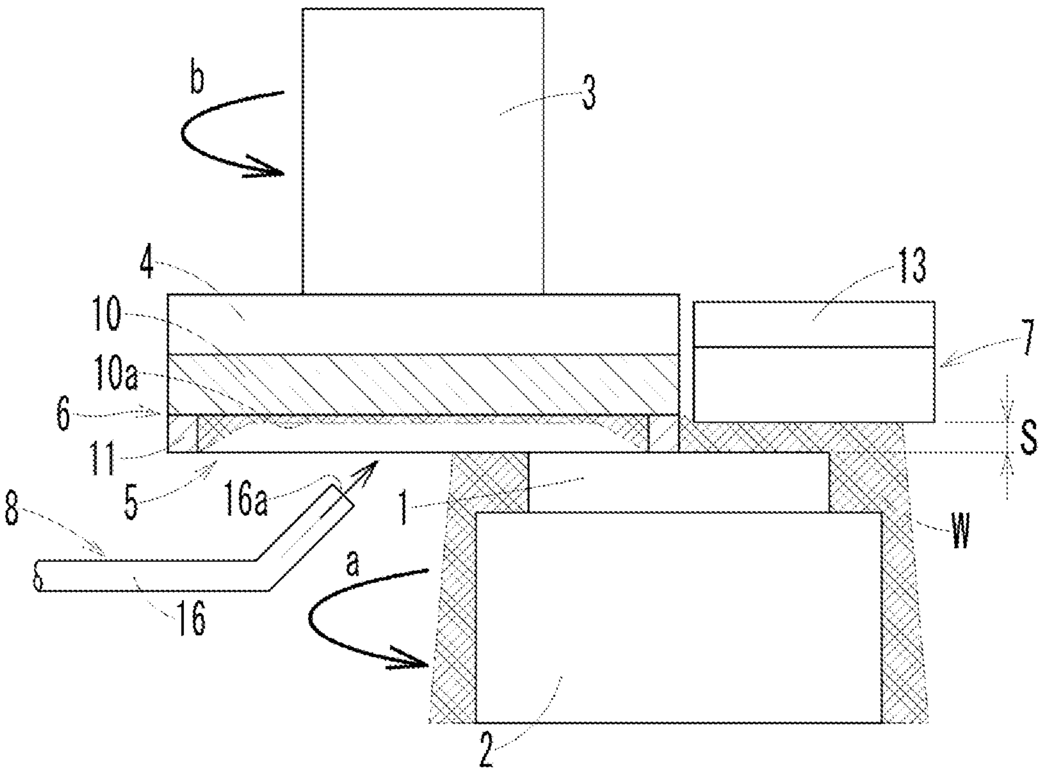
FIG. 15 is a configuration diagram of an anodic oxidation-assisted grinding apparatus according to a sixth embodiment of the present disclosure.

FIG. 15 shows a sixth embodiment of the present disclosure. In the anodic oxidation-assisted grinding apparatus, the pouring port 16*a*, which is located on the front end side of the electrolyte supply pipe 16 configuring the pouring unit 8, is disposed obliquely upward or upward toward the lower surface 10*a* of the grindstone base material 10 of the grinding wheel 6, and the electrolyte W is ejected obliquely upward or upward from the pouring port 16*a* toward a lower surface 10*a* side of the grindstone base material 10.

In this way, the electrolyte W can also be poured onto the workpiece 1 via the inner peripheral side of the conductive grindstone 11 by utilizing a centrifugal force generated in a case where the grindstone base material 10 rotates. Accordingly, the pouring unit 8 may be configured to pour the electrolyte W onto the workpiece 1 from an upper side, may be configured to pour the electrolyte W upward from a lower side, or may be configured to pour the electrolyte W from a lateral direction.

Figure 16:
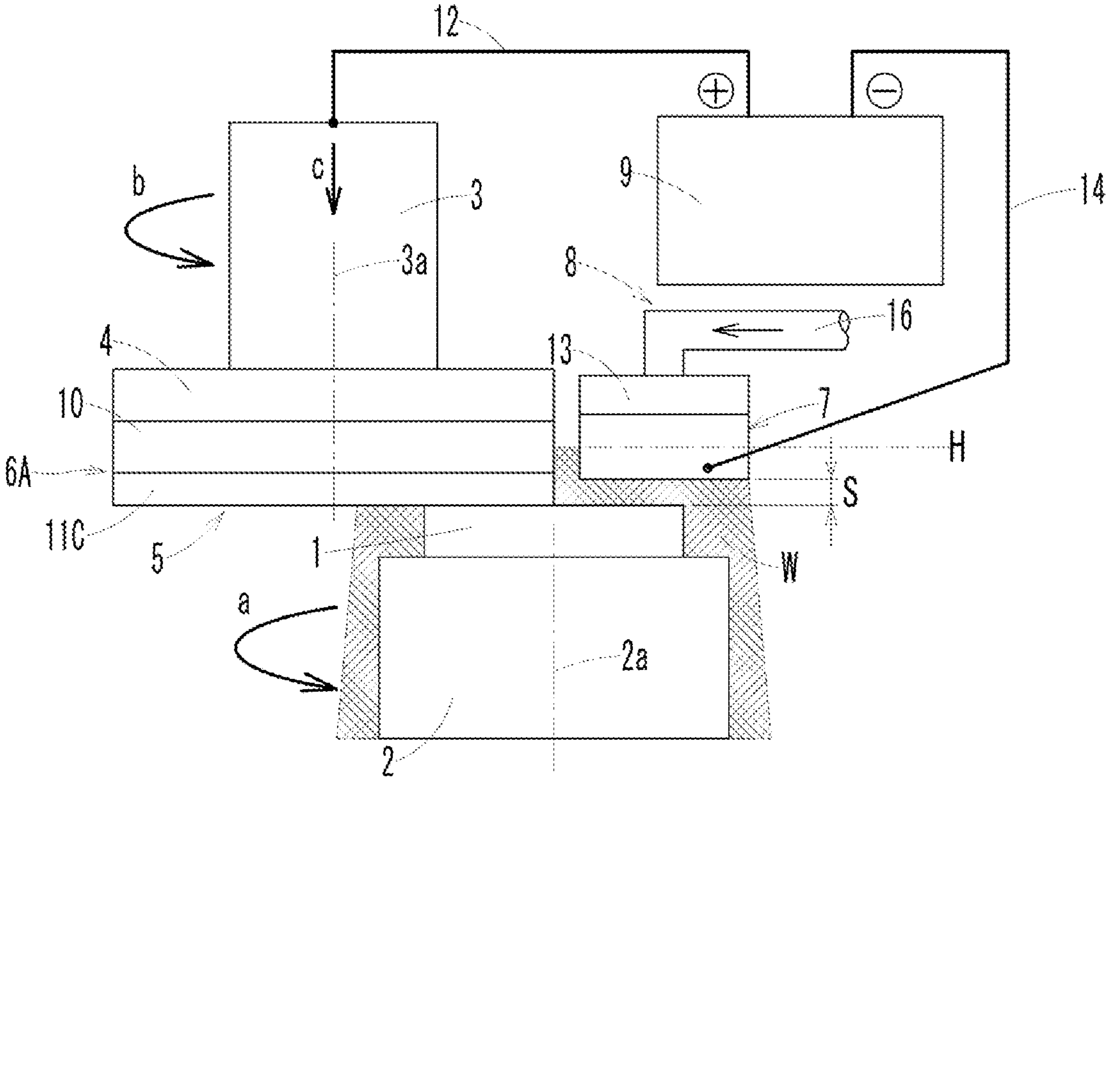
FIG. 16 is a configuration diagram of an anodic oxidation-assisted grinding apparatus according to a seventh embodiment of the present disclosure.

FIG. 16 shows a seventh embodiment of the present disclosure. In the anodic oxidation-assisted grinding apparatus, the workpiece 1 is ground with a general abrasive grain grinding wheel 6A or a grinding pad containing general abrasive grains provided with a non-conductive grindstone 11C.

In a case of using the general abrasive grain grinding wheel 6A including the conductive grindstone base material 10 and the non-conductive grindstone 11C mounted on a lower side of the grindstone base material 10, the anode 5 can be configured by the grindstone base material 10. In this case, a liquid level H of the electrolyte W on the workpiece 1 is set up to a height of the grindstone base material 10 in order to make the electrolyte W not only fill between the workpiece 1 and the cathode 7 but also come into contact with the grindstone base material 10. Accordingly, in a case where the grindstone base material 10 comes into contact with the electrolyte W, a direct current can flow from the grindstone base material 10 to the cathode 7 via the electrolyte W, the workpiece 1, and the electrolyte W.

In this case, a surface of a portion of the workpiece 1 overlapping the cathode 7 is anodized by the direct current flowing through the workpiece 1 via the electrolyte W, and an anodic oxidation film is formed on the surface of the workpiece 1, so that processing of removing the anodic oxidation film by the non-conductive grindstone 11C of general abrasive grains can be performed.

Accordingly, in a case of using the general abrasive grain grinding wheel 6A using the non-conductive grindstone 11C, the positive potential-side power supply line 12 of the direct current power source 9 is connected to an upper end side of the grindstone spindle 3, and power can also be supplied via the grindstone base material 10 without using the non-conductive grindstone 11C.

In this case, it is necessary to ensure that the direct current flows from the grindstone base material 10 to the cathode 7 via the electrolyte W, the workpiece 1, and the electrolyte W, and the anode 5 and the cathode 7 are not short-circuited. It is conceivable to prevent a short circuit by appropriately combining any of factors or a plurality of the factors, such as a positional relationship between the anode 5 and the cathode 7, a distance or a gap between the cathode 7 and the workpiece 1, and a flow direction of the electrolyte W. For example, short-circuiting between the anode 5 and the cathode 7 can be prevented by sufficiently increasing a distance between the anode 5 and the cathode 7, while the gap between the cathode 7 and the workpiece 1 is as small as 500 μm or less.

Further, in order to anodize the portion of the workpiece 1 corresponding to the cathode 7, it is necessary to make an electric resistance, including the electrolyte W, from the grindstone base material 10 to the workpiece 1 smaller than an electric resistance, including the electrolyte W, from the cathode 7 to the workpiece 1.

Figure 17:
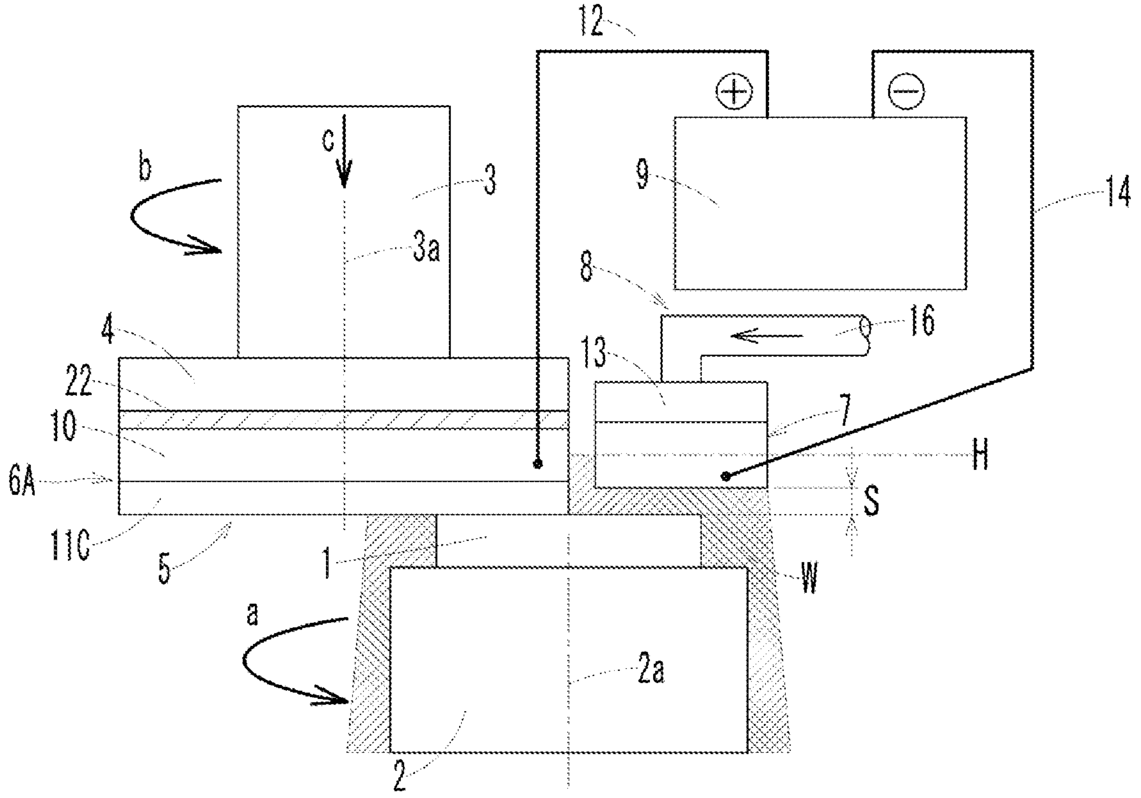
FIG. 17 is a configuration diagram of an anodic oxidation-assisted grinding apparatus according to an eighth embodiment of the present disclosure.

FIG. 17 shows an eighth embodiment of the present disclosure. In the anodic oxidation-assisted grinding apparatus, an insulating member 22 is interposed between the grindstone spindle flange 4 and the grindstone base material 10 at the lower end of the grindstone spindle 3, and the positive potential-side power supply line 12 of the direct current power source 9 is relatively slidably connected to the grindstone base material 10.

That is, in the embodiment, the general abrasive grain grinding wheel 6A including the non-conductive grindstone 11C on the lower side of the conductive grindstone base material 10 is also employed. The insulating member 22 is interposed between the grindstone spindle flange 4 and the grindstone base material 10 at the lower end of the grindstone spindle 3, and the positive potential-side power supply line 12 of the direct current power source 9 is relatively slidably connected to a grindstone base material 10 side. Other configurations are the same as those of the seventh embodiment.

As described above, in a case where the insulating member 22 is interposed between the grindstone spindle flange 4 and the grindstone base material 10, and the positive potential-side power supply line 12 of the direct current power source 9 is connected to the grindstone base material 10, a positive potential of the direct current power source 9 can also be applied to the workpiece 1 from the grindstone base material 10 via the electrolyte W without using the grindstone spindle 3. The insulation between the grindstone spindle 3 and the grindstone base material 10 may be performed at other positions.

Figure 18:
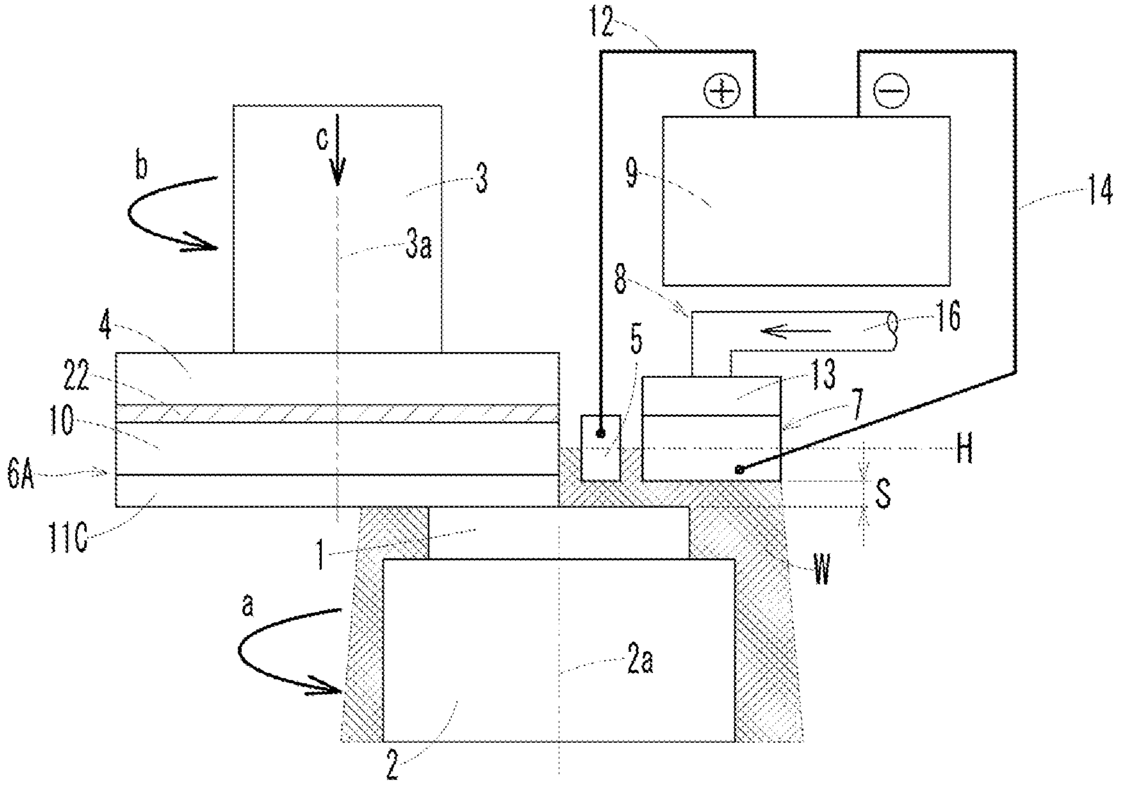
FIG. 18 is a configuration diagram of an anodic oxidation-assisted grinding apparatus according to a ninth embodiment of the present disclosure.

FIG. 18 shows a ninth embodiment of the present disclosure. In the anodic oxidation-assisted grinding apparatus, the anode 5 for power supply is provided separately from the grinding wheel 6, and a positive potential of the direct current power source 9 is applied to the anode 5. The insulating member 22 is interposed between the grindstone spindle flange 4 of the grindstone spindle 3 and the conductive grindstone base material 10 of the grinding wheel 6. The structure of the pouring unit 8 for the electrolyte W and the other structures are the same as those of each embodiment.

In a case where the dedicated anode 5 is provided as described above, a power supply system on a positive potential side can be simplified as compared with a case where a power supply system is provided for the rotating grindstone spindle 3 and the grindstone base material 10 of the grinding wheel 6. The pouring unit 8 may be provided on the anode 5 for power supply, and the electrolyte W may be supplied from an anode 5 side to the workpiece 1.

Figure 19:
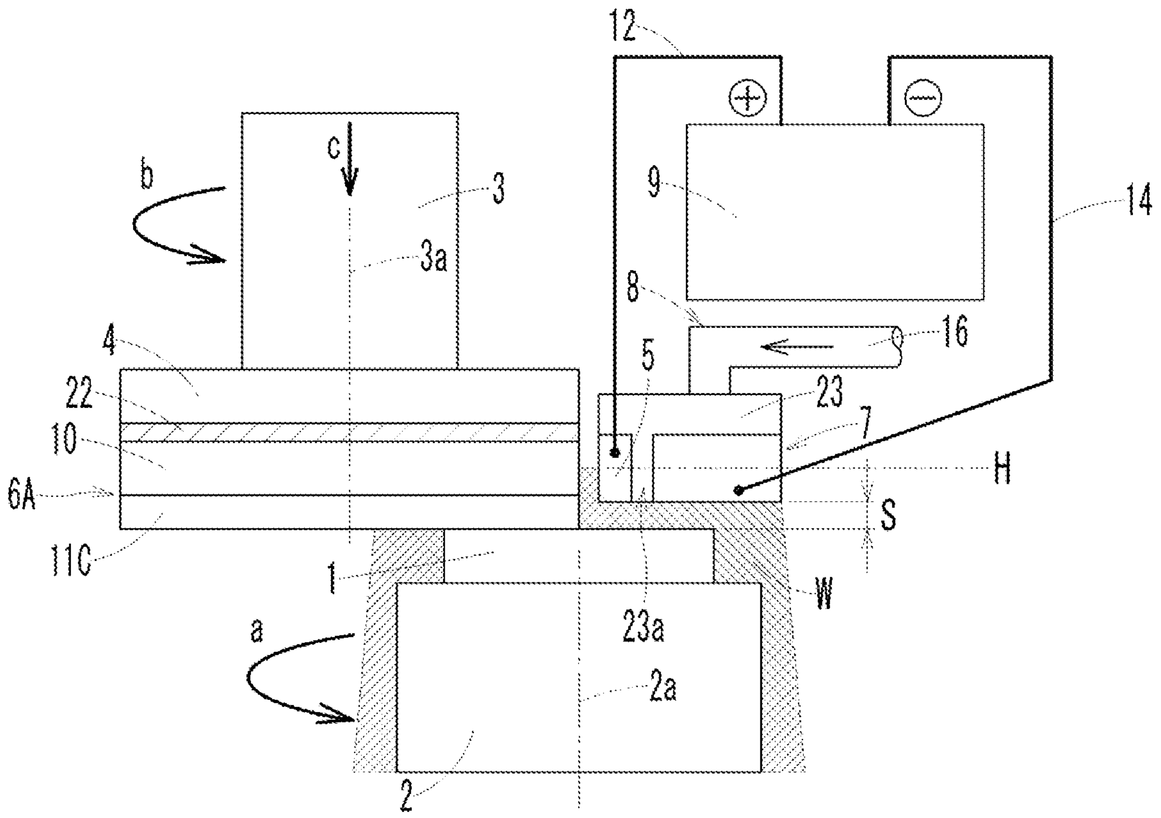
FIG. 19 is a configuration diagram of an anodic oxidation-assisted grinding apparatus according to a tenth embodiment of the present disclosure.

FIG. 19 shows a tenth embodiment of the present disclosure. In the anodic oxidation-assisted grinding apparatus, the anode 5 and the cathode 7, which are dedicated to power supply, are provided on an insulating support member 23, and the anode 5 and the cathode 7 are integrated. In the support member 23, an insulating portion 23*a* is provided between the anode 5 and the cathode 7. The structure of the pouring unit 8 for the electrolyte W and the other structures are the same as those of each embodiment.

According to the configuration as described above, since the anode 5 and the cathode 7 can be handled as an integrated object, it is easy to adjust the gap between the workpiece 1 and each electrode, and to attach and detach the electrodes, and a periphery of the electrodes can be reduced in size and arranged efficiently as compared with a case where the anode 5 and the cathode 7 are individually disposed.

Although the embodiments of the present invention have been described in detail above, the present invention is not limited to the embodiments, and various modifications can be made without departing from the gist of the present invention. Each embodiment shows an anodic oxidation-assisted grinding apparatus in which the grinding wheel 6 and the workpiece rotating device 2 are configured to rotate around the vertical axis, but the grinding wheel 6 and the workpiece rotating device 2 may be configured to rotate around a horizontal axis or an inclined axis, and a direction of the rotation is not limited.

The anode 5 is preferably provided on the grinding wheel 6 or 6A side, but may be provided separately from the grinding wheel 6 or 6A. In a case where the anode 5 is in contact with the workpiece 1, the portion of the surface of the workpiece 1 facing the cathode 7 can be easily anodized, but in a case where the anode 5 is electrically connected to the workpiece 1 via the electrolyte W without being in direct contact with the workpiece 1, the workpiece 1 can also be similarly anodized. Accordingly, a predetermined gap is required between the cathode 7 and the workpiece 1, but a gap between the anode 5 and the workpiece 1 may or may not be present. The anodization reaction of the portion of the surface of the workpiece 1 facing the cathode 7 is greatly affected by a size of the gap between the workpiece 1 and the cathode 7, and the efficiency tends to improve as the gap reduces. Therefore, the gap between the workpiece 1 and the cathode 7 is preferably minute.

In a case where the electrolyte W is poured onto the workpiece 1 mounted on the workpiece rotating device 2 by the pouring unit 8, a pouring position of the electrolyte W is preferably set near a center of the workpiece 1 in order to diffuse the electrolyte W on the workpiece 1 utilizing the centrifugal force generated in a case where the workpiece 1 rotates. However, in a case where the gap between the workpiece 1 and the cathode 7 is minute, the electrolyte W can be permeated into the gap between the workpiece 1 and the cathode 7 due to surface tension of the electrolyte W or the like. Therefore, in this case, even in a case where the pouring position of the electrolyte W is away from the center, the electrolyte W can be permeated between the workpiece 1 and the cathode 7 against the centrifugal force generated when the workpiece 1 rotates.

The pouring unit 8 for the electrolyte W may be provided on the cathode 7 side or the anode 5 side, or may be provided separately from the anode 5 and the cathode 7. A plan view shape of the electrode such as the cathode 7 with an electrolyte supply function may be appropriately determined in consideration of conditions around the arrangement position of the electrode, and any shape can be adopted. In this case, it is preferable to increase the amount of overlap between the cathode 7 and the workpiece 1.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An anodic oxidation-assisted grinding apparatus comprising:

a grinding wheel including a conductive grindstone configured to grind a surface to be ground of a workpiece, the conductive grindstone serving as an anode;

a cathode disposed in at a lateral side of the grinding wheel and configured to face the surface to be ground of the workpiece with a gap between the cathode and the workpiece;

an electrolyte supply passage configured to pour an electrolyte at least between a cathode and a workpiece; and a direct current power source including a positive potential-side power supply line electrically connected to the conductive grindstone serving as the anode and a negative potential-side power supply line electrically connected to the cathode, wherein the direct current power source is configured to apply a direct current from the conductive grindstone serving as the anode to the cathode via the electrolyte and the workpiece to form an anodic oxidation film on a surface of the workpiece;

the conductive grindstone is configured to grind the anodic oxidation film formed on the surface of the workpiece, and the cathode and the conductive grindstone are disposed so as to face the surface to be ground of the workpiece.

2. The anodic oxidation-assisted grinding apparatus according to claim 1, wherein the electrolyte is poured from a side of the anode or a side of the cathode.

3. The anodic oxidation-assisted grinding apparatus according to claim 1, wherein the anode is configured to apply a positive potential to the workpiece directly or indirectly via the electrolyte.

4. The anodic oxidation-assisted grinding apparatus according to claim 1, wherein the anode and the cathode is configured to oscillate relative to the workpiece.

5. An anodic oxidation-assisted grinding method comprising:

providing the anodic oxidation-assisted grinding apparatus according to claim 1;

pouring the electrolyte at least between the cathode and the workpiece;

applying the direct current, via the electrolyte, to the anode, the cathode, and the workpiece to form the anodic oxidation film on the surface of the workpiece; and grinding, with a grindstone, the anodic oxidation film formed on the surface of the workpiece.

* * * * *